(12) United States Patent
Sayyadi

(10) Patent No.: US 12,556,769 B2
(45) Date of Patent: *Feb. 17, 2026

(54) ADVERTISEMENT SELECTION FOR INSERTION INTO VIDEO CONTENT BASED ON VIEWING HABITS

(71) Applicant: Comcast Cable Communications, LLC, Philadelphia, PA (US)

(72) Inventor: Hans Sayyadi, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/898,236

(22) Filed: Sep. 26, 2024

(65) Prior Publication Data

US 2025/0024103 A1    Jan. 16, 2025

Related U.S. Application Data

(63) Continuation of application No. 17/966,986, filed on Oct. 17, 2022, now Pat. No. 12,137,272, which is a continuation of application No. 17/123,916, filed on Dec. 16, 2020, now Pat. No. 11,477,532, which is a continuation of application No. 16/750,998, filed on Jan. 23, 2020, now Pat. No. 10,897,651, which is a continuation of application No. 15/905,366, filed on Feb. 26, 2018, now Pat. No. 10,587,923, which is a continuation of application No. 14/540,663, filed on Nov. 13, 2014, now Pat. No. 9,942,609.

(51) Int. Cl.
*H04N 21/466* (2011.01)
*G06N 5/022* (2023.01)
*G06N 7/00* (2023.01)
*G06N 20/00* (2019.01)
*H04N 21/442* (2011.01)
*H04N 21/458* (2011.01)

(52) U.S. Cl.
CPC ........ *H04N 21/4668* (2013.01); *G06N 5/022* (2013.01); *G06N 7/00* (2013.01); *G06N 20/00* (2019.01); *H04N 21/44204* (2013.01); *H04N 21/458* (2013.01); *H04N 21/4661* (2013.01)

(58) Field of Classification Search
CPC ........ H04N 21/4668; H04N 21/44204; H04N 21/458; G06N 5/022; G06N 7/00; G06N 20/00

See application file for complete search history.

(56) References Cited

U.S. PATENT DOCUMENTS

| | | | |
|---|---|---|---|
| 6,446,261 B1 | 9/2002 | Rosser | |
| 6,698,020 B1 | 2/2004 | Zigmond et al. | |
| 6,922,680 B2 * | 7/2005 | Buczak | H04N 21/44222 348/E7.054 |
| 7,017,172 B2 | 3/2006 | Schaffer et al. | |
| 7,096,486 B1 | 8/2006 | Ukai et al. | |
| 8,583,566 B2 | 11/2013 | Aravamudan et al. | |
| 9,055,343 B1 | 6/2015 | Lewis et al. | |
| 9,088,808 B1 | 7/2015 | He et al. | |
| 11,785,280 B1 * | 10/2023 | Dakss | H04N 21/43079 725/37 |

(Continued)

*Primary Examiner* — Fernando Alcon
(74) *Attorney, Agent, or Firm* — Banner & Witcoff, Ltd.

(57) ABSTRACT

Aspects described herein describe selecting advertisements for insertion into video content. An advertisement may be selected based on when content was previously consumed.

50 Claims, 8 Drawing Sheets

(56) References Cited

U.S. PATENT DOCUMENTS

| | | |
|---|---|---|
| 2002/0083443 A1 | 6/2002 | Eldering et al. |
| 2002/0083451 A1 | 6/2002 | Gill et al. |
| 2002/0123928 A1 | 9/2002 | Eldering et al. |
| 2002/0129368 A1* | 9/2002 | Schlack .......... H04N 21/44016 |
| | | 348/E7.071 |
| 2002/0147645 A1 | 10/2002 | Alao et al. |
| 2002/0152459 A1 | 10/2002 | Bates et al. |
| 2003/0110491 A1* | 6/2003 | Rodriguez ......... H04N 21/4542 |
| | | 725/51 |
| 2003/0110500 A1 | 6/2003 | Rodriguez |
| 2003/0163817 A1 | 8/2003 | Han |
| 2003/0182249 A1 | 9/2003 | Buczak |
| 2003/0229629 A1 | 12/2003 | Jasinschi et al. |
| 2006/0206912 A1 | 9/2006 | Klarfeld et al. |
| 2007/0038671 A1 | 2/2007 | Holm et al. |
| 2007/0118848 A1 | 5/2007 | Schwesinger et al. |
| 2008/0155614 A1 | 6/2008 | Cooper et al. |
| 2009/0144797 A1 | 6/2009 | Wang et al. |
| 2010/0138865 A1 | 6/2010 | Rai et al. |
| 2011/0008019 A1 | 1/2011 | Hirano |
| 2011/0093337 A1 | 4/2011 | Granit et al. |
| 2011/0138413 A1 | 6/2011 | Hjelm et al. |
| 2013/0016955 A1 | 1/2013 | Pejaver |
| 2013/0097624 A1 | 4/2013 | Joh |
| 2013/0103634 A1 | 4/2013 | Jojic et al. |
| 2013/0144750 A1 | 6/2013 | Brown |
| 2013/0260796 A1 | 10/2013 | Hasek |
| 2013/0262998 A1 | 10/2013 | Suzuki |
| 2013/0276024 A1 | 10/2013 | Grant et al. |
| 2013/0311408 A1 | 11/2013 | Bagga et al. |
| 2013/0312018 A1 | 11/2013 | Elliott et al. |
| 2014/0122502 A1 | 5/2014 | Kalmes et al. |
| 2014/0149424 A1 | 5/2014 | Kalmes et al. |
| 2014/0149425 A1 | 5/2014 | Kalmes et al. |
| 2014/0149434 A1 | 5/2014 | Aravamudan et al. |
| 2014/0150005 A1 | 5/2014 | Kalmes et al. |
| 2014/0215506 A1 | 7/2014 | Kalmes et al. |
| 2014/0223480 A1 | 8/2014 | Berry et al. |
| 2014/0223548 A1 | 8/2014 | Wassingbo |
| 2014/0226671 A1 | 8/2014 | Broome et al. |
| 2015/0039644 A1 | 2/2015 | Trivedi |
| 2015/0310307 A1 | 10/2015 | Gopalan |
| 2018/0108041 A1 | 4/2018 | Kang et al. |
| 2019/0174188 A1 | 6/2019 | Li et al. |
| 2020/0201897 A1* | 6/2020 | Palanciuc .............. G06N 20/00 |
| 2023/0009268 A1* | 1/2023 | Zhang ................ G06Q 10/1093 |
| 2023/0229411 A1* | 7/2023 | Thakkar ................ G06N 20/20 |
| 2024/0064347 A1 | 2/2024 | Samuelson |

\* cited by examiner

ADVERTISEMENT SELECTION FOR INSERTION INTO VIDEO CONTENT BASED ON VIEWING HABITS

CROSS-REFERENCE TO RELATED APPLICATIONS

This application is a continuation of and claims priority to U.S. patent application Ser. No. 17/966,986, filed Oct. 17, 2022, which is a continuation of U.S. patent application Ser. No. 17/123,916, filed Dec. 16, 2020 (now U.S. Pat. No. 11,477,532), which is a continuation of U.S. patent application Ser. No. 16/750,998, filed Jan. 23, 2020 (now U.S. Pat. No. 10,897,651), which is a continuation of U.S. patent application Ser. No. 15/905,366, filed Feb. 26, 2018 (now U.S. Pat. No. 10,587,923), which is a continuation of U.S. patent application Ser. No. 14/540,663, filed Nov. 13, 2014 (now U.S. Pat. No. 9,942,609), each of which is hereby incorporated by reference in its entirety.

BACKGROUND

The selection of movies, television shows, games, music, and other content available to users continues to expand. To assist individuals in selecting content to consume, content providers may make recommendations to the individuals. Techniques for improving those recommendations are needed.

SUMMARY

Some of the various features described herein relate to systems and methods for providing content recommendations. The content may be video content, audio content, text content, interactive content, and other types of content as well as combinations of such content.

Aspects described herein provide techniques for providing content recommendations such as, for example, recommendations for video content provided by a cable network. The content recommendation techniques described in further detail below determine the extent to which previously consumed content should contribute to content considered for recommendation to a user based on the consumption time of the previously consumed content. The consumption habits of users have been observed to occur at regular intervals. These intervals are employed to adjust contribution factors for the previously consumed content when making content recommendations.

As explained in further detail below, the value of a contribution factor for previously consumed content is adjusted based on a time difference between the consumption time for that previously consumed item and a reference time associated with the content items considered for recommendation. In particular, the contribution factor is adjusted based on the proximity of that time difference to a time period that corresponds to a content consumption interval. As one example, the time period may be 24 hours, and the contribution factor for the previously consumed content item may be adjusted based on the proximity of the time difference to a multiple of 24 hours, which correspond to daily and weekly consumption interval. In some example implementations, the contribution factor may be adjusted based on the proximity of the time difference to a multiple of two time periods, for example, a multiple of 24 hours as well as a multiple of 168 hours. Based, at least in part, on the contribution factors of previously consumed content items, recommendation scores are determined for content items considered for recommendation to a user. Content recommendations are then provided to the user based on those recommendation scores.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Features described herein relate to providing content recommendations for content-consuming users by adjusting a contribution factor associated with previously consumed content for determining a recommendation score for candidate content recommended to an individual. As described in further detail below, the value of the contribution factor is based, at least in part, on a time difference between the consumption time of the previously consumed content and a reference time associated with the candidate content. In some example implementations, the value of the contribution factor may be relatively higher where the time difference is relatively closer to a multiple of 24 hours and relatively lower where the time difference is relatively further from a multiple of 24 hours. Stated differently, the contribution factor may weight the contribution that the previously consumed content makes to a recommendation score for candidate content based on the proximity of the time difference to a multiple of 24 hours. In other example implementations, the contribution factor may be adjusted based on alternative periodicities or observed viewing patterns. Various ways of using this time difference are described further below, following the description of an example network and computing device on which features herein may be used.

Figure 1:
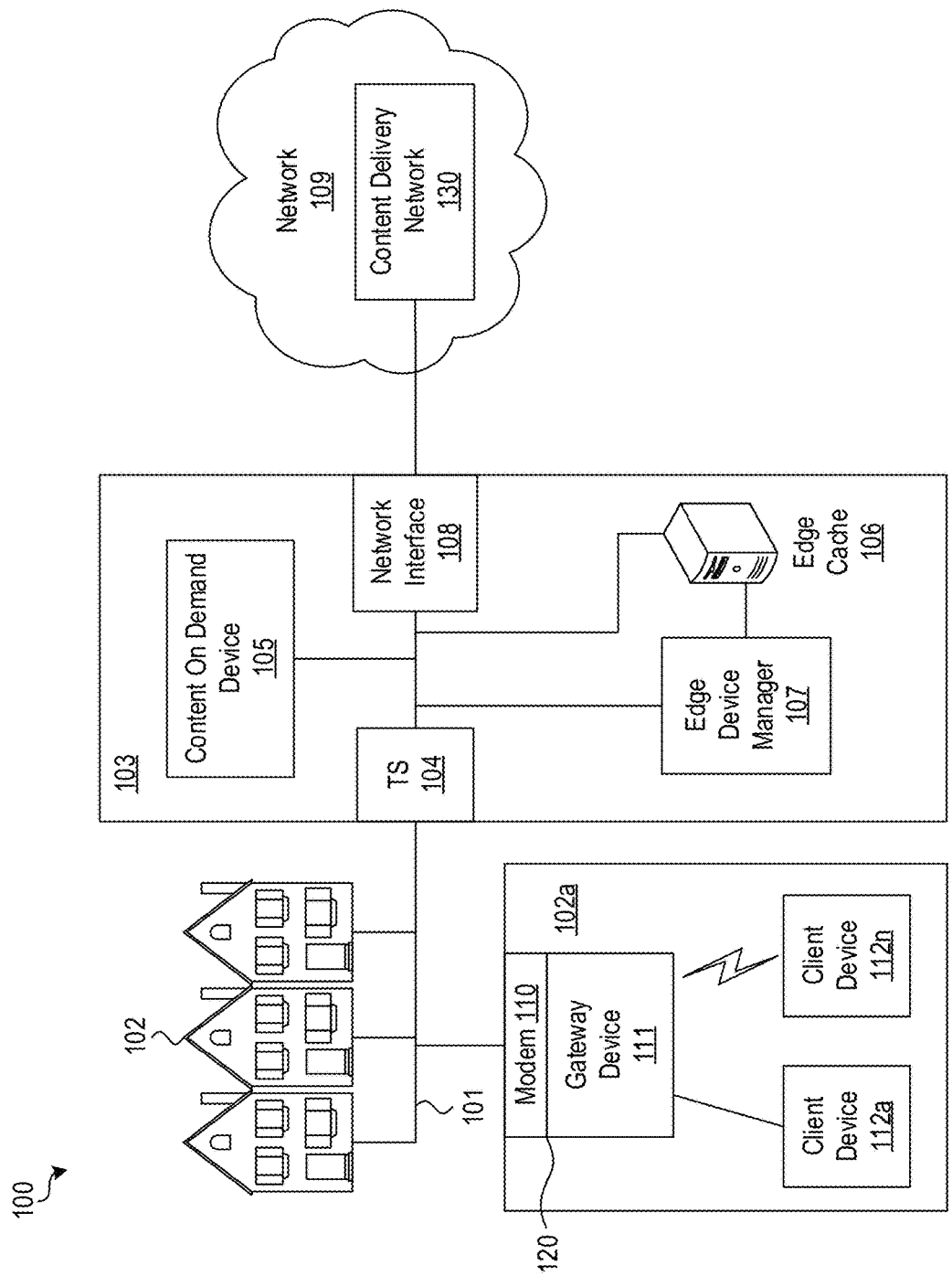
FIG. 1 illustrates an example information access and distribution network.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103). The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. These homes 102 may be in the same service area, such as a service area of the local office 103. The homes 102 in the same service area may be geographically located within the same region(s). These homes 102 may also be physically and/or directly connected to the same network utilized by the local office 103 to provide content (e.g., an interconnection of the links 101). Although the term home is used by way of example, the locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of the links 101 and backend devices such as an edge device manager 107, an edge cache 106, and a content-on-demand device 105 (to be discussed further below). The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies.

The local office 103 may also include one or more network interfaces 108, which can permit the local office 103 to communicate with various other local offices, devices, and/or network 109. The interface 108 may include corresponding circuitry needed to communicate with other local offices, devices, and/or networks. For example, the interface 108 may facilitate communications with other devices on networks such as a cellular telephone networks and/or satellite networks.

The network 109 may include networks of Internet devices, telephone networks, cellular telephone networks, fiber optic networks, local wireless networks (e.g., WiMAX), satellite networks, and any other desired network. The network 109 may include and/or function as a cloud computing infrastructure comprising various processing and/or memory devices (e.g., servers, databases, application providers, etc.). The network 109 may include one or more content delivery networks 130 that manage one or more content libraries that store content to be provided to users, such as at their homes 102. The content stored at the content libraries may be, for example, video-on-demand movies, streaming movies, television programs, songs, text listings, etc. A master content library of a content delivery network 130 may provide all the content available to users at their homes 102. For example, if users have access to 150,000 titles (e.g., on-demand movies and television shows), the 150,000 titles may be stored at and/or provided by the master library. In some aspects, the master library might not store all of the content available to users and/or subscribers. Instead, the master library may be connected to one or more other content delivery networks of other content providers (not shown) in order to retrieve content requested by users. The content providers may be managed, owned, and/or operated by a service provider that manages, owns, and/or operates, for example, the content delivery network 130 or managed, owned, and/or operated by entities different from the service provider.

As noted above, the local office 103 may include a variety of devices, such as a content-on-demand device 105, an edge cache 106, and an edge device manager 107 that may be configured to perform various functions. For example, the content-on-demand device 105 may receive requests for on-demand content from users at the homes 102, through the interface 104. As will be described in further detail in the examples below, the content-on-demand device 105 may process each received request and provide content and/or a list of recommended content in response to the requests. The content-on-demand device 105 may include software to validate user identities and entitlements, locate and retrieve requested data, encrypt the data, and/or initiate delivery (e.g., streaming, downloading) of the content to the requesting user and/or device. The content-on-demand device 105 may communicate with the edge cache 106 and/or the edge device manager 107 to provide the content or recommendation lists. For example, the content-on-demand device 105 may transmit commands to the edge device manager 107 to either provide or not to provide requested content and/or recommendation lists to the users, as will be described in further detail in the examples below. The edge cache 106 may be one or more computing devices that are configured to store content to be provided to users in the homes. The content stored at the edge cache 106 may be a subset of the content stored at a content library of the content delivery network 130. For example, if a content library of the content delivery network 130 stores and/or provides the 20,000 titles mentioned above, the edge cache 106 may store and/or provide 5,000 of those titles. Alternatively, some of the content stored at the edge cache 106 might not overlap with the content stored at the content library of the content delivery network 130. For example, 4,000 of the titles at the edge cache 106 may correspond to titles stored at the content library of one content delivery network. The remaining 1,000 might be stored at the content library of another content delivery network. The edge device manager 107 may query one or more databases, such as the edge cache 106 and/or content library of a content delivery network 130 for content to be provided to users at their homes 102.

The local office 103 may also include one or more additional computing devices (e.g., servers). For example, the local office 103 may include an application server that may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. These application servers may provide services in conjunction with content and/or recommendation lists provided to users.

The content stored at each local office 103 (e.g., within an edge cache) may differ from the content stored at other local offices. In some aspects, the content stored (e.g., cached or otherwise temporarily stored) at each local office may dynamically vary based on the service area of the respective local office. The service area of the local office 103 may include the homes 102 illustrated in FIG. 1. In some aspects, the service area may be defined by a physical content delivery network. For example, the homes 102 may be part of the service area of the local office 103 because they are physically and/or directly connected to the local office by one or more communication lines 101 (coaxial cables, optical fibers, wireless connections, etc.). A home 102 may be part of more than one service area. For example, if a home 102a is also physically and/or directly connected to the local office 103, the home 102a may also be part of the service area of local office 103. In some aspects, the demographics and/or interests in content within a service area may be similar. For example, a local office that serves a suburban area may serve primarily single-family homes and/or dwellings having families. A local office in an urban area, such as a large city, may serve primarily young adults that live in those areas. Because the demographics of each service area may be unique to that service area, content requested by users within each service area may be similar. Content requests by users in different service areas, on the other hand, may differ significantly. For example, suburban users may include children and/or parents interested in children's programs. Urban users, on the other hand, may be more interested in new and/or popular television shows than children's programs. As will be described in further detail in the examples below, content stored at a particular edge cache, such as the edge cache 106, and/or content recommendations provided to users may be based on the service area and/or the local office 103 that the user is part of and/or connected to.

An example home 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway device 111. The gateway device 111 may be a computing device that communicates with the device 110 to allow one or more other devices in the home to communicate with the local office 103 and other devices beyond the local office. The gateway device 111 may be a wireless or wired router, set-top box (STB), digital video recorder (DVR), computer server, or any other desired computing device. The gateway device 111 may also include (not shown) local network interfaces to provide communication signals to the devices 112a-n in the home, such as televisions, additional STBs, personal computers, laptop computers, wireless devices (wireless laptops and netbooks, mobile phones, mobile televisions, personal digital assistants (PDA), etc.), and any other desired devices. These devices (along with the gateway device 111 and/or the modem 110) may be used to request content. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
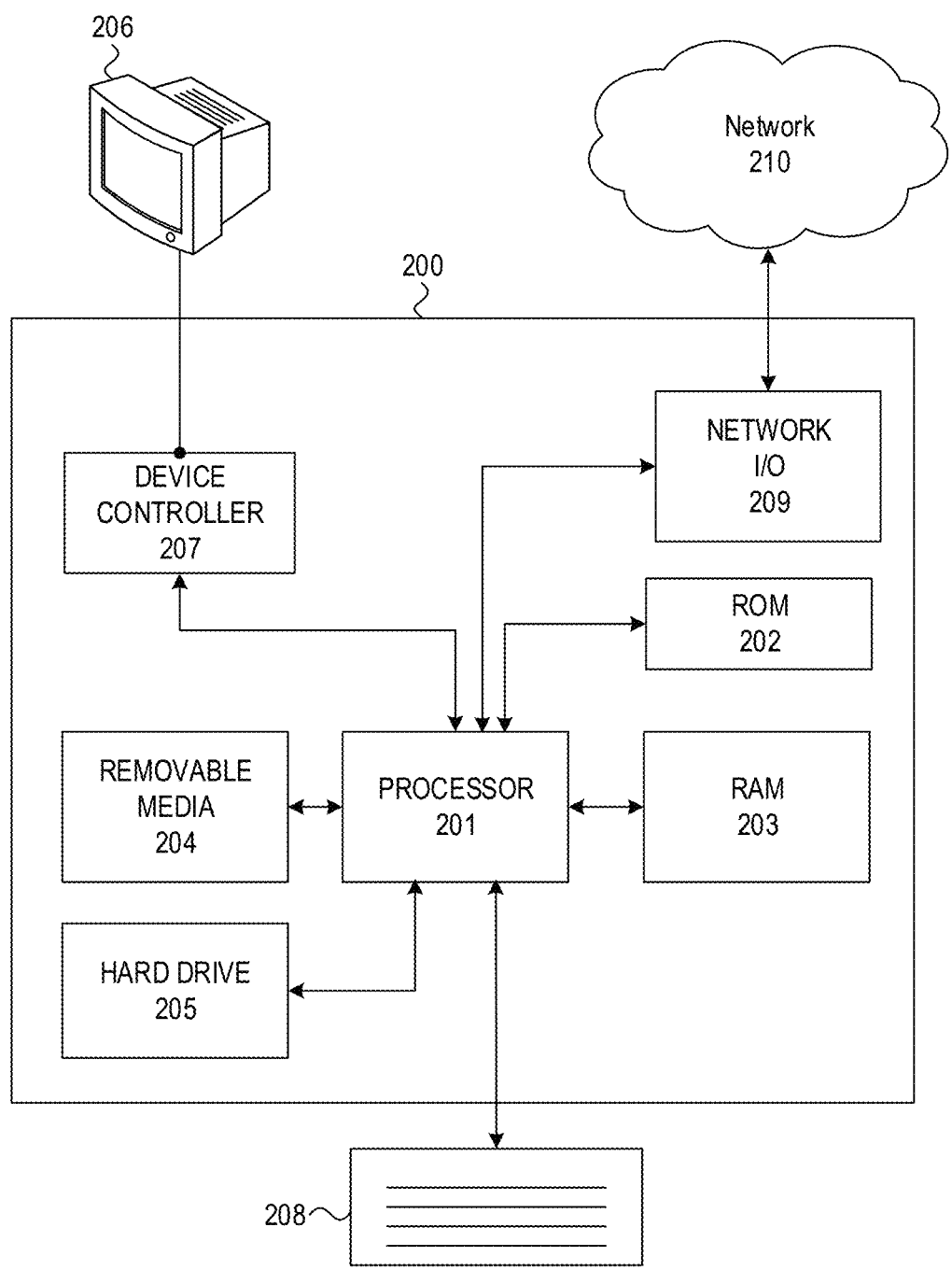
FIG. 2 illustrates an example computing platform on which various elements described herein can be implemented.

The various devices described herein may be computing devices, and FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Content, as used in this description, refers to any type of media that may be consumed by an individual. Examples of content that may be consumed include video content, audio-only content, image content, text content, interactive content, and the like. Video content may also include audio and thus additionally be referred to as audiovisual content. In addition content includes, for example, broadcasted content, transmitted content, and recorded content. Furthermore content includes content that is provided, for example, at a scheduled broadcast or transmission time, on demand in response to receipt of a request for the content, and as playback from content recorded and stored on a recording device or other type of data storage device. Some non-limiting examples of content include television broadcasts, radio broadcasts, web broadcasts, video-on-demand, and digitally recorded content. As described in further detail below, the techniques for providing content recommendations are based on content previously consumed by an individual. As used in this description, consuming content refers to, for example, listening to audio content, viewing video content and image content, reading text content, and interacting with interactive content.

The proposed approach for making content recommendations is described in further detail below with respect to video content including video content scheduled for broadcast at a particular broadcast time, on-demand video content, and digitally recorded video content. With the benefit of this disclosure, it will be appreciated that the approach to providing video content recommendations described below may be adapted for providing recommendations of other types of content. Various techniques may be selectively employed for making content recommendations such as, for example, video content recommendations. In some example implementations, content recommendations may be based on a determined similarity between candidate content and previously consumed content. In these example implementations, a similarity score for a pairing of the candidate content and previously viewed content is obtained, and the recommendation score for the candidate content is based, at least in part, on that similarity score. In other example implementations, the recommendation score may be obtained for a content menu rather than specific content. Content menus may correspond to content format (e.g., audio, video, text, etc.), content type (e.g., movie, television series, sports, etc.), content genre (e.g., drama, comedy, horror, etc.), and so forth. In these other example implementations, the recommendation score may be obtained for a content menu. In each example, the recommendation scores are further based on one or more contribution factors obtained for previously viewed content. The contribution factor is adjusted based on a time difference between a consumption time of the previously viewed content and a reference time. Generally stated, the techniques for adjusting the contribution factor of previously consumed content described herein may be employed in various techniques to making recommendations based on previously consumed content.

As noted above and described in further detail below the content recommendations are based on content previously consumed by an individual. The previously consumed content may be stored in a consumption history that identifies a consumption time of the consumed content. The consumption time may be the time the individual started consuming the content or finished consuming the content. In some example implementations, the consumption history may include both the consumption start time and the consumption finish time. With respect to video content, for example, the consumption history may be a viewing history of video content previously viewed by the individual. The previously viewed video content may include video programs (e.g., movies, television shows, etc.) selected by the viewer for viewing on demand, video programs provided at a prescheduled broadcast time, and video programs recorded to a recording device such as, e.g., a digital video recorder (DVR) for subsequent playback. The content provider may maintain the viewing history for a viewer that includes respective entries that each identify a video program viewed by the viewer and a timestamp indicating the date and time the video program was viewed by the viewer. For content scheduled for broadcast, this time may be the broadcast time. For on-demand content, this time may be the time the user requested the on-demand content or completed a viewing of the on-demand content. For recorded content, this time may be the time an individual initiated playback of the recorded content or completed a viewing of the recorded content. A gateway device (such as gateway device 111) may submit an update to the viewing history when an individual selects or tunes to broadcasted content. An on-demand device (such as on-demand device 105) may submit an update the viewing history for a viewer whenever a viewer requests to view a video program on demand or completes a viewing of the on-demand video program. A recording device (such as a DVR) may also submit an update to the viewing history when playback of recorded content is initiated or when playback of the recorded content is complete. The application server of a local office (such as local office 103) that monitors the viewing habits of a viewer may manage the updates to the viewing history for a viewer when the viewer views a video program. Content recommendations for other types of content may be provided in a similar fashion using consumption histories configured for those types of content, e.g., a listening history for audio content, a reading history for text content, and an interaction history for interactive content.

Figure 3:
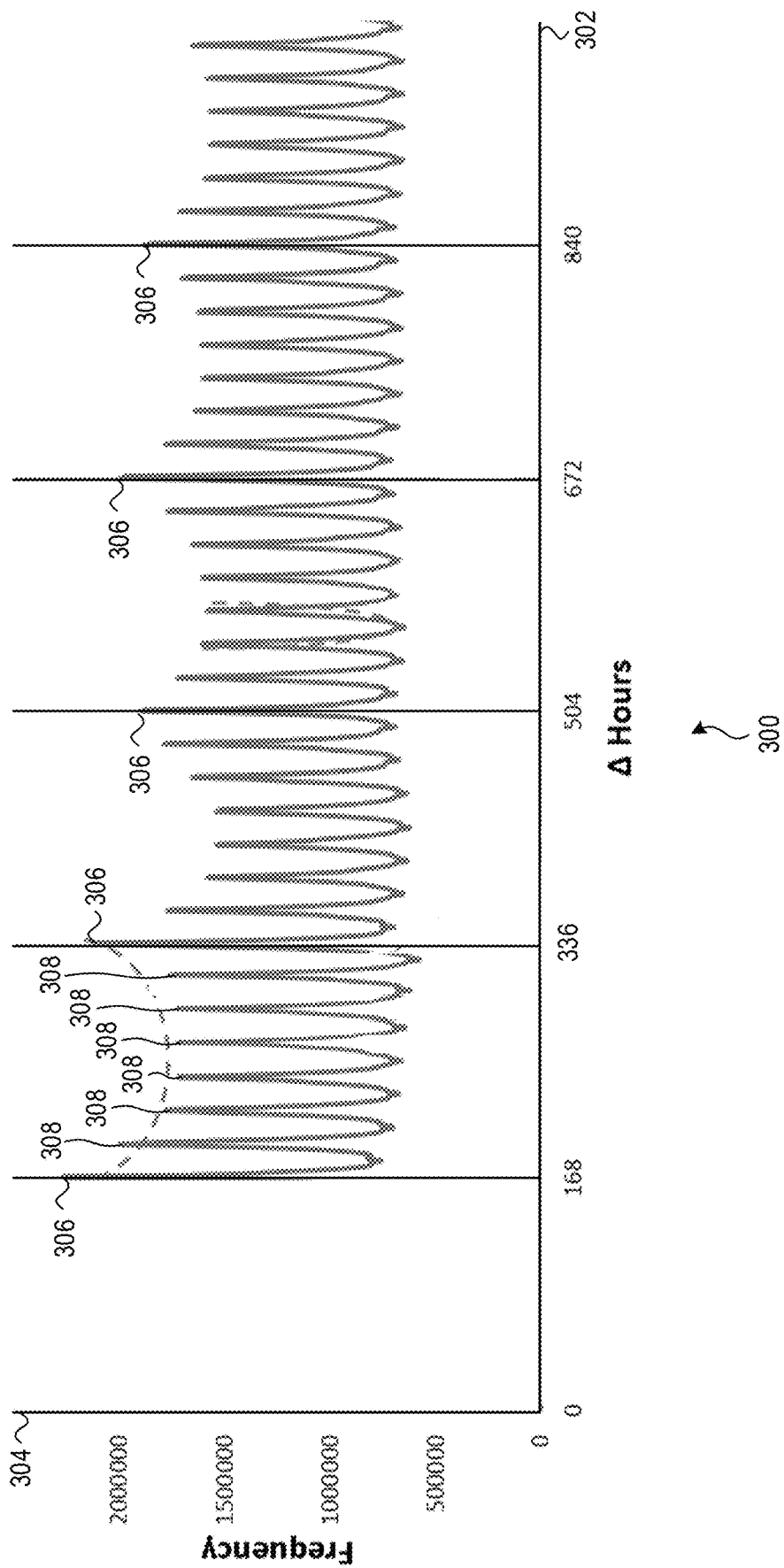
FIG. 3 illustrates an example graph of viewing patterns generated from viewing history data.
Figure 4:
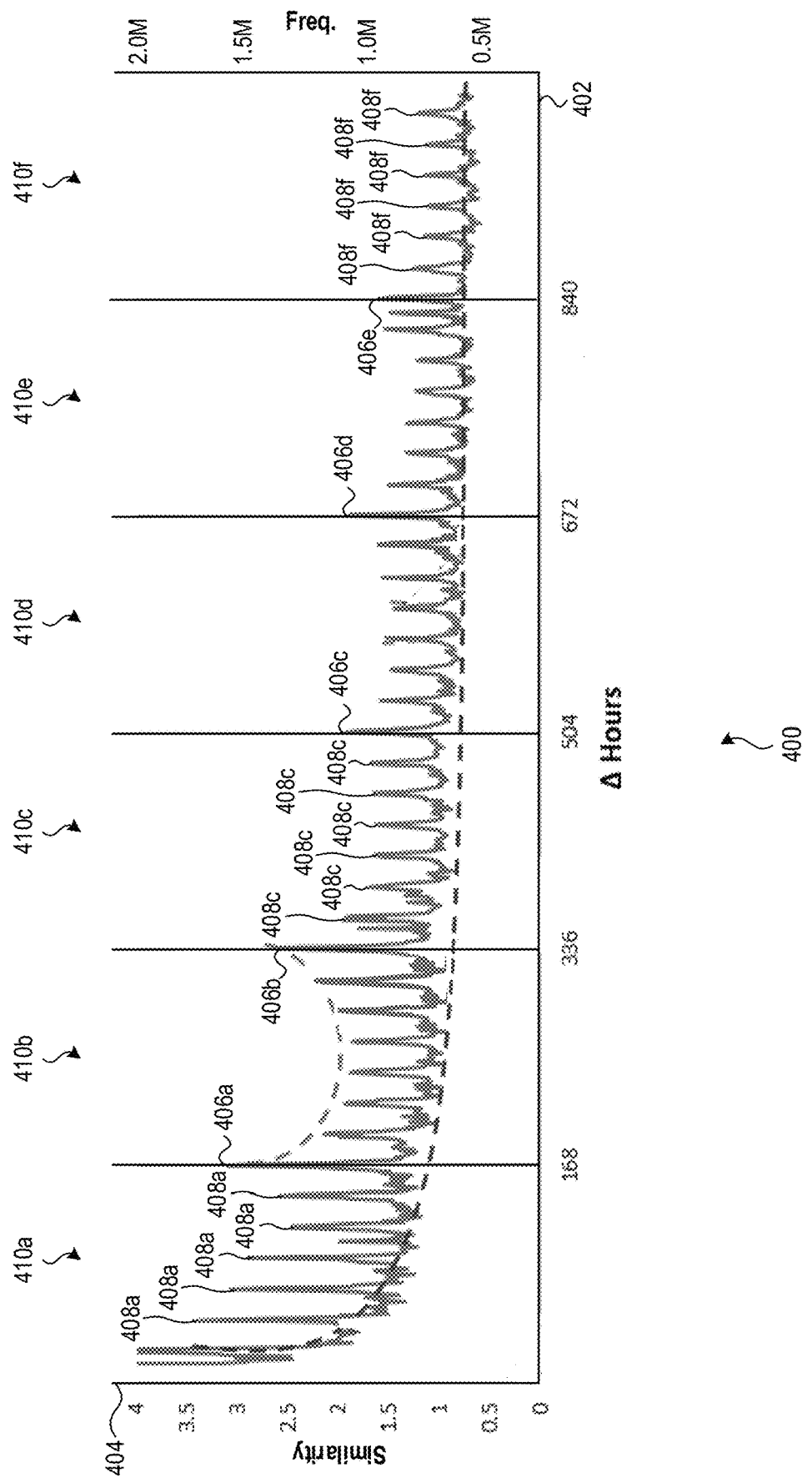
FIG. 4 illustrates another example graph of viewing patterns generated from viewing history data.

A content provider may compile large volumes of data related to the consumption habits of respective individuals. The content provider may thus leverage this consumption history data when generating content recommendations. In particular, the consumption histories of individuals have been analyzed, and the insights acquired through these analyses have been utilized to implement an approach to providing content recommendations that advantageously improves the recommendations presented to individuals including recommendation techniques that are based on the similarity between candidate content and previously consumed content. Similar techniques may be employed to improve other techniques for making content recommendations such as, for example, content menu recommendations as noted above. FIG. 3 and FIG. 4 below illustrate the relationships that have been discovered between viewing patterns and content similarity.

Referring now to FIG. 3, a graph 300 of viewing patterns generated from viewing history data is shown. To generate the graph 300, multiple viewing histories were compiled based on data collected from multiple gateways respectively located at multiple households (e.g., gateways 111 located at homes 102). As noted above, the viewing history may include an entry for each viewing, V, of video content, C, that was viewed at a particular date and time, T. Accordingly each entry in the viewing history may be designated using the 2-tuple, $V=\{C, T\}$.

To generate the data points for the graph 300, each viewing, V, of a viewing history was paired with each other viewing in the viewing history. As an example, consider a first viewing history having viewings, $V_1$, $V_2$, $V_3$, and $V_4$. The viewing pairings, in this example, would thus include: $\{V_1, V_2\}$, $\{V_1, V_3\}$, $\{V_1, V_4\}$, $\{V_2, V_3\}$, $\{V_2, V_4\}$, and $\{V_3, V_4\}$. For each pairing, the time difference, $\Delta T$, between viewing the video content, $C_x$ and $C_y$, was calculated, e.g., the absolute value of the difference in hours between the viewing times, $\Delta T=|T_1-T_2|$. Accordingly, each pairing, P, of viewings, V, may be designated using the 3-tuple, $P=\{C_x, C_y, \Delta T\}$.

Each data point in the graph 300 thus corresponds to a pairing, P. The x-axis 302 plots $\Delta T$ of each pairing, P, as the number of hours that elapsed between viewings of the paired video content, $C_x$, and $C_y$. The y-axis 304 plots the frequency of the time difference, $\Delta T$, in the pairings generated. The graph 300 thus illustrates the total number of pairings, P, where the viewings of the content, $C_x$ and $C_y$, were $\Delta T$ hours apart.

Based on the graph 300, several methods for recommending content are proposed. As seen in the graph 300, weekly viewing habits tend to repeat with content viewings occurring at around the same time each week. The graph 300 includes respective peaks 306 at about 168 hours, 336 hours, 504 hours, 672 hours, and 840 hours. It will be appreciated that a week is 168 hours long (24 hours/day×7 days/week=168 hours/week). Therefore the weekly peaks 306 correspond to viewings that are around the same time and that are about one week to about five weeks apart. As also seen in the graph 300, daily viewing habits tend to repeat with content viewings occurring at around the same time each day. The graph 300 includes six respective peaks 308 between each of the weekly peaks 306. It will thus be appreciated that each peak 308 corresponds to viewings 24 hours apart. Therefore the daily peaks 308 correspond to viewings that are around the same time each day. Improved methods of making content recommendations are thus proposed that leverage these observations. For the sake of clarity not all of the daily peaks 308 have been labeled in FIG. 3.

The pairings, P, used to generate the graph 300 of FIG. 3 plotted the number of viewed program pairs against the time differences between the programs in each pair. The pairings do not consider the similarity between the video content, $C_x$, and $C_y$, of the paired viewings. Taking into consideration the similarity of the video content of the pairing has provided additional observations regarding the viewing habits of viewers.

Referring now to FIG. 4, an example graph 400 of viewing patterns generated from viewing history data as well as video content similarity is shown. To generate the graph 400, multiple viewing histories were compiled and viewings, V, were paired together as described above with reference to FIG. 3. To generate the data points for graph 400, however, a similarity score, S, was calculated for the video content, $C_x$, and $C_y$, of each pairing. Determining similarity scores is discussed in further detail below. The similarity score, S, was thus included with the video content, $C_x$, and $C_y$, and the time difference, $\Delta T$, between viewings to obtain an extended pairing, P'. Accordingly the extended pairing, P', may be designated using the 4-tuple, P'={$C_x$, $C_y$, $\Delta T$, S}.

Each data point in the graph 400 thus corresponds to an extended pairing, P'. The x-axis 402 plots each extended pairing, P', as the number of hours elapsed, $\Delta T$, between viewings of the paired video content, $C_x$, and $C_y$. The y-axis 404 plots the frequency of the similarity score, S, in the extended pairings generated. The graph 400 thus illustrates the total number of extended pairings, P', where the video content, $C_x$, and $C_y$, have a similarity score, S, and were viewed $\Delta T$ hours apart.

Based on the graph 400, the inventors arrived at additional conclusions with respect to viewing habits of viewers and the relationship between those viewing habits and content similarity. Like the graph 300 in FIG. 3, the graph 400 includes respective weekly peaks 406 (collectively) and respective daily peaks 408 (collectively) for the similarity scores, S. Again for the sake of clarity, not all daily peaks 408 have been labeled in FIG. 4. The daily peaks 408 on the graph 400 indicate that video content viewed around the same time each day (e.g., some multiple of 24 hours apart) is relatively more similar than content viewed for other time differences (e.g., 10, 12, 18, 20, etc., hours apart). The weekly peaks 406 similarly indicate that video content viewed around the same time each week (e.g., some multiple of 168 hours apart) is also relatively more similar than content viewed for other time differences (e.g., 158, 178, 326, 346 494, 514, etc., hours apart). The graph 400 further indicates that video content viewed around the same time each week is relatively more similar than video content viewed around the same time each day. As also seen in the graph 400 of FIG. 4, the similarity scores associated with the weekly peaks 406 are relatively higher than the similarity scores associated with the daily peaks 408, and the similarity scores for the weekly/daily programs were higher than other program pairings that were not weekly or daily.

The similarity scores for the extend pairings also exhibit an overall decay as the time difference between viewings increases. Stated differently, the graph 400 indicates that the similarity score is inversely proportional to the number of hours that elapse between respective viewings of video content. In the graph 400 of FIG. 4, similarity scores for six weeks 410a-f of extending pairings of video content are shown. The time difference, $\Delta T$, between 0 and 168 corresponds to the first week 410a; between 168 and 336 hours corresponds to the second week 410b; between 336 hours and 504 hours for the third week 410c; and so forth respectively for the fourth week 410d, the fifth week 410e, and the sixth week 410f. As seen in FIG. 4, the average similarity score gradually decreases between the first week 410a and the sixth week 410f. In particular, the graph 400 illustrates that the similarity score for the weekly peak 406a at the end of the first week 410a is higher than the similarity score for the weekly peak 406b at the end of the second week 410b which is, in turn, higher than the similarity score for the weekly peak 406c at the end of the third week 410c, and so forth through the sixth week 410f. In addition, the graph 400 illustrates that the average similarity score for the daily peaks 408a during the first week 410a is higher than the average similarity score for the daily peaks 408c during the third week 410c which is, in turn, higher than the average similarity score for the daily peaks 408f during the sixth week 410f. Accordingly the graph 400 indicates that the similarity between video content decreases as the time that elapses between viewing the video content increases.

With respect to the similarity between the video content paired, various approaches may be selectively employed to determine the similarity score. In some example implementations, the similarity between paired video content may be based on metadata for the content, e.g., content type (movie, television series, news program, etc.), genre (drama, action, horror, romance, etc.), release date, actors, and other types of content metadata that will be appreciated by those skilled in the art of content distribution. In these examples, video content may be determined to be relatively more or less similar depending on which and/or how many items of metadata they have in common.

In other example implementations, the similarity score between paired video content may be based on the number of viewers that have previously watched both programs. For convenience, the function for obtaining a similarity score, S, for a pairing, P, of content, $C_x$ and $C_y$, may be expressed as $S(C_x, C_y)$. For example, consider video content $C_1$, $C_2$, and $C_3$. The similarity score, $S_1$, for the pairing, $P_1$, of the video content, $C_1$ and $C_2$, may be based on the total number of individuals that previously watched both video content $C_1$ and video content $C_2$. Likewise the similarity score, $S_2$, for the pairing, $P_2$, of the video content, $C_1$ and $C_3$, may be based on the total number of people that previously watched both video content $C_1$ and video content $C_3$. If more people watched both video content $C_1$ and $C_2$ as compared to video content $C_1$ and $C_3$, then the similarity score, $S_1(C_1, C_2)$, for the pairing, $P_1$, would be higher than the similarity score, $S_2(C_1, C_3)$, for the pairing, $P_2$. Determining a similarity scores is described in further detail in commonly-owned U.S. patent application Ser. No. 13/277,482 entitled "Recommendation System" and filed on Oct. 20, 2011 which published as U.S. Patent Application Publication No. 2013/0103634 on Apr. 25, 2013 and which is incorporated by reference herein in its entirety.

The insights acquired from the graph 300 of FIG. 3 and the graph 400 of FIG. 4 have been applied to a recommendation process that utilizes content similarity when generating a list of recommended video content for a viewer. As described in further detail below, the recommendation process may track the content that a user consumes. For each piece of consumed content, the process may entail storing information identifying the content and the time the user consumed the content. The process may further select candidate content for recommendation to a viewer. The candidate content selected may be based on the type of content, e.g., on-demand content, broadcast content, recorded content, etc. In some implementations all candidate content may be selected for recommendation. In other example implementations, the candidate content selected may first be filtered from a pool of candidate content, e.g., filtered by content format, content type, content cost, content genre, content release date, performer, and other types of criteria suitable to filter the pool of candidate content. The pool of candidate content may be filtered, for example, in response to a content search performed by an individual. The candidate content can also be selected by identifying content the user has not yet consumed, i.e., unconsumed content.

As noted above one type of recommendation process may utilize content similarity to make content recommendations. This example recommendation process may entail generating content pairings by pairing candidate content with previously consumed content in a consumption history. For each pairing, the recommendation process may generate a similarity score and determine a time difference for the pairing. The time difference may be the total number of hours that have elapsed between the time the user consumed the previous content—i.e., the consumption time—and a reference time associated with the candidate content. As described in further detail below, the reference time for the candidate content may depend on the content type of the candidate content. The recommendation process may then adjust a contribution factor for the previously consumed content in order to change the contribution the previously consumed content makes to the recommendation score for the candidate content. In this way the contribution factor functions as a weight for the previously consumed content. The value of the contribution factor, in this example, is based, at least in part, on the proximity of the time difference to an integer multiple of 24 hours or 168 hours. In addition, the contribution factor may be adjusted based on the decay of the similarity score as the time difference increases as observed and illustrated in the graph 400 of FIG. 4. In other words the decay of the similarity score may be inversely proportional to the time difference. The recommendation score for the candidate content may then be obtained by aggregating the respective contribution factors and similarity scores for each pairing. Aggregation may include summing the respective products of the contribution factors and similarity scores as explained in further detail below.

The graph 400 shown in FIG. 4 is just one example of the results that may be obtained through an analysis of the viewing histories compiled by a content provider. As illustrated in the graph 400 and described above, the inventors have discovered a relationship between video content similarity and a difference between consumption times. Other analyses of consumption histories may reveal relationships between other characteristics associated with the content and the difference between consumption times of that content. For example, an analysis of consumption histories with respect to content format (e.g., audio, video, text, interactive, etc.), content type (e.g., on-demand, broadcast, recorded, etc.), content cost (e.g., paid, free), and so forth may reveal alternative viewing patterns and alternative periodicities (i.e., viewing patterns that do not conform to multiples of 24 hours). The relationship graphs of these alternative viewing patterns and alternative periodicities may thus exhibit different curves relative to the curve seen in the graph 400 of FIG. 4. Nevertheless the contributions of previously consumed content may be adjusted based on these alternative viewing patterns and alternative periodicities to improve other content recommendation techniques that are based on alternative characteristics.

For recommendation techniques that are based on content similarity, the similarity may be a value quantifying the similarity between candidate content and previously consumed content and expressed by the variable, S. The contribution factor may function to weight the contribution previously consumed content makes to a recommendation score and may be expressed by the variable, W. As described above, the contribution factor, W, in this example, is based on the proximity of the time difference to an integer multiple of 24 hours. The value of the contribution factor may be highest for programs where the time difference is an integer multiple of 168 hours (a week) and 24 hours (a day), and may be progressively lower as the time difference departs from the 24 hour and 168 hour multiples.

The recommendation score, R, for candidate content, C, may be expressed as a sum of the respective contribution factors, W, and the similarity scores, S, for pairings of the candidate content, C, and each previously-consumed content, $V_1 \ldots V_n$, in the consumption history. The recommendation score, R, may be expressed as the following:

$$R = 1 + W_1 S_1 + W_2 S_2 + \ldots + W_n S_n$$

In the example formula above, $S_1$ represents the similarity score for the pairing of content, C, and previously viewed content, $V_1$–S(C, $V_1$); $S_2$ represents the similarity score for the pairing of content, C, and previously viewed content, $V_2$–S(C, $V_2$); and S, represents the similarity score for the pairing of content, C, and previously viewed content, $V_n$–S(C, $V_n$). Other formulas for obtaining the recommendation score, R, may be selectively employed. In some example implementations, obtaining the recommendation score may include determining a popularity score for the candidate content and incorporating the popularity score in the formula for the recommendation score. For convenience the function for obtaining a popularity score, O, for candidate content, C, may be expressed as O(C). The popularity score, O, may be, for example, the percentage of all users that consumed the content, C. In these other implementations, a recommendations score, R', may be expressed as:

$$R' = O \times (1 + W_1 S_1 + W_2 S_2 + \ldots + W_n S_n)$$

The pseudocode below may be employed to obtain a contribution factor for previously consumed video content based on the relationship between content similarity and consumption time observed from the graph 400 in FIG. 4. The values in the pseudocode below were obtained by performing regression and curve fitting techniques to the curve illustrated in the graph 400.

TABLE 1

Example Pseudocode for Obtaining Contribution Factor

```
timeDiff = time₂ – time₁,
dayHourDiff = | (timeDiff % 24) – 12) |;
weekDayDiff = | [(timeDiff ÷ 24) % 7] – 3.5 |;
feature[1] = timeDiff ^ –0.399          // overall decay
feature[2] = (dayHourDiff ≥ 11) ? timeDiff ^ –0.448 : 0;   // peak decay
feature[3] = dayHourDiff ^ 2            // day booster
```

TABLE 1-continued

Example Pseudocode for Obtaining Contribution Factor

```
feature[4] = weekDayDiff ^ 2           // week booster
feature[5] = 1                          // constant
coefficients = { 10.705, 5.6732, 0.0009, 0.0067, 0.0472 };
contribution = 0;
for each i = 1 ... 5
    contribution = contribution + ( features[i] × coefficients[i] );
```

In the pseudocode above, the timeDiff value is the difference between the consumption time of previously consumed content and a reference time associated with candidate content as described above. The dayHourDiff is configured such that its value is higher where the timeDiff value is closer to a multiple of 24 hours and lower where the timeDiff value is further from a multiple of 24 hours. For example, the dayHourDiff value will be around 12 when then timeDiff value is around a multiple of 24 hours and will be around 0 when the timeDiff value is around a multiple of 24 hours plus or minus 12 hours (i.e., the furthest the timeDiff can be from a multiple of 24 hours). Similarly the weekDayDiff is configured such that its value is higher where the timeDiff value is closer to a multiple of 168 hours (i.e., 7 days) and lower where the timeDiff value is further from a multiple of 168 hours. For example, the weekDayDiff value will be around 3.5 when the timeDiff value is around a multiple of 168 hours and will be around 0 when the timeDiff value is around a multiple of 168 hours plus or minus 84 hours (i.e., 3.5 days which is the furthest the timeDiff value can be from a multiple of 168 hours). In this way, the pseudocode shown by way of example achieves generation of a contribution factor that conforms to the daily and weekly viewing periodicities observed and illustrated in the graph 400 of FIG. 4. The pseudocode, in this example, also employs various features to account for the additional observations in the viewing patterns observed from the graph 400 of FIG. 4. The first feature, feature[1], is configured and employed to account for the overall decay in content similarity as the time difference increases observed in the graph 400 of FIG. 4. The second feature, feature[2], is configured and employed to account for the sharp decline in similarity from the daily peaks observed in the graph 400 of FIG. 4 (e.g., peaks 408). The third and fourth features, feature[3] and feature[4], are employed to boost the contribution factor where the timeDiff is close to a multiple of 24 hours or 168 hours respectively. By squaring the dayHourDiff and the weekDayDiff the contribution factor for previously consumed content will be boosted when that content was consumed some multiple of 24 hours or 168 hours previously thereby accounting for the daily and weekly peaks observed in the graph 400 of FIG. 4. The fifth feature, feature[5], represents a constant that may be selectively employed. The pseudocode, in this example, also employs a set of coefficients in order to weight the various features in the calculation of the contribution score. As seen in the table above, the contribution is the sum total of each feature multiplied by its corresponding coefficient.

The pseudocode above is provide by way of example as one way of obtaining a contribution factor for a recommendation technique that utilizes content similarity when making content recommendations. Other approaches for obtaining a contribution factor may be selectively employed for other types of recommendation techniques that rely on additional or alternative content characteristics when making content recommendations. As noted above, the values employed for the features and coefficients, in this example, were obtained through regression and curve fitting techniques applied to the graph 400 of FIG. 4. Other implementations may employ regression and curve fitting techniques to obtain suitable values and coefficients for other relationship curves that are observed.

The content being considered for recommendation, C, may be paired with one, some, or all previously consumed content appearing in the consumption history. For example, in some implementations, the recommendation process may limit the content pairings to content previously consumed within the past x weeks (e.g., 6 weeks). The time difference threshold may depend on the processing power available at the device generating the recommendation scores and a desired response time. For example, the time difference threshold may be set relatively lower (e.g., 2-3 weeks) when a relatively faster response time is desired in order to reduce the number of pairings when determining the recommendation score.

Figure 5:
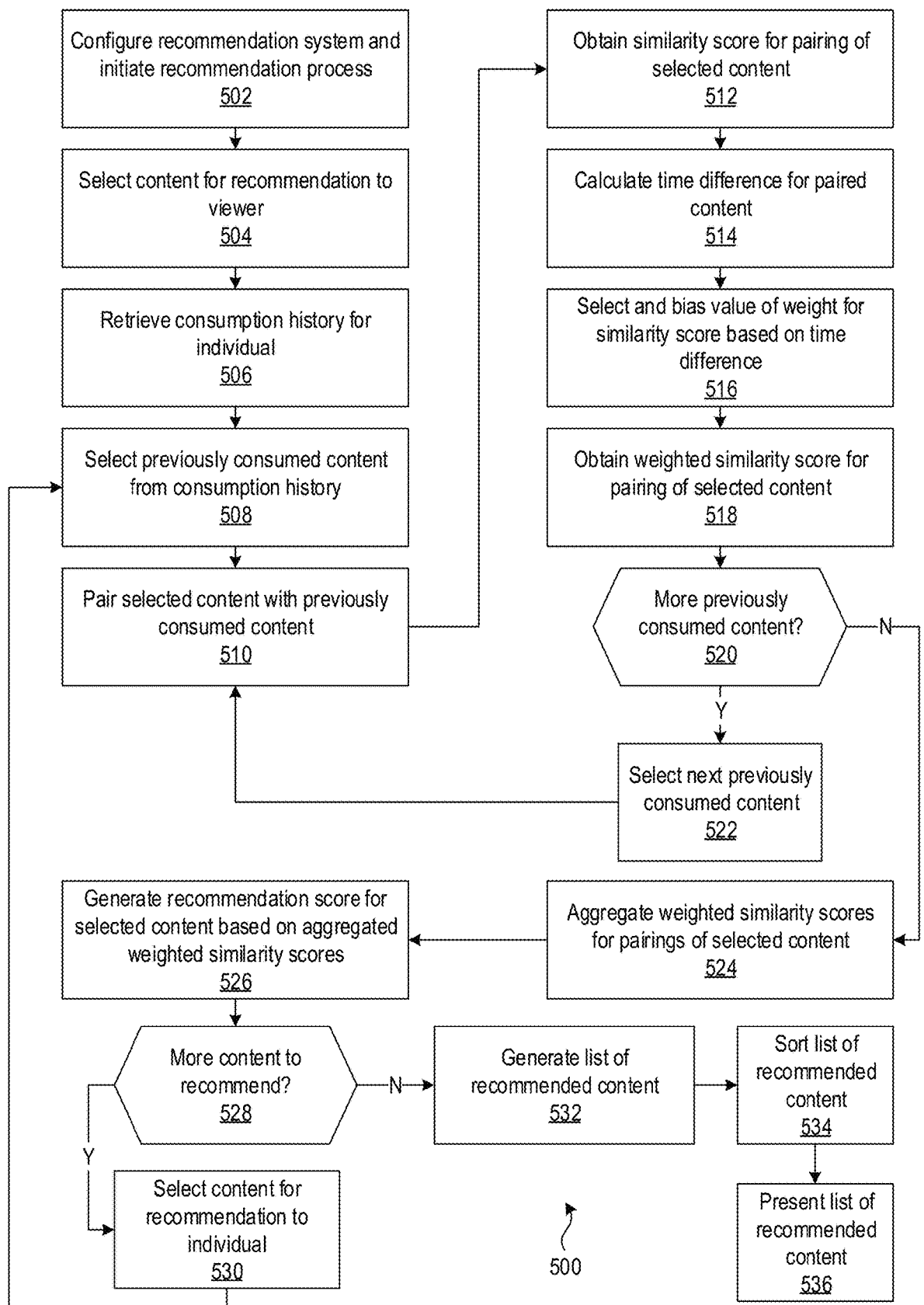
FIG. 5 illustrates a flowchart of example method steps for providing content recommendations.

Referring now to FIG. 5, a flowchart of an example method 500 for providing content recommendations based on content similarity is shown. A recommendation system (FIG. 6A-B) may be configured and a recommendation processor may initiate the recommendation process (block 502). Configuring the recommendation system may include, for example, compiling and storing the consumption history for the individual. During initiation, the recommendation processor may locate the consumption history for a user and may locate content to consider for recommendation, e.g., one or more video programs. The recommendation process may be initiated automatically on a periodic basis (e.g., as an automatic recommendation task) or in response to various triggers. In some example implementations, the recommendation processor may be configured to initiate the recommendation process on a daily, weekly, or monthly basis. Other periods may be selectively employed. The recommendation processor may, additionally or alternatively, be configured to initiate the recommendation process in response to receipt of an explicit recommendation request received at a gateway device (e.g., the gateway device 111) from an individual. The recommendation processor may, additionally or alternatively, be configured to initiate the recommendation process in response to receipt of an on-demand request received at a gateway device from an individual. The recommendation processor may, additionally or alternatively, be configured to initiate the recommendation process in response to detecting the individual has accessed a programming guide at the gateway device, e.g., an electronic programming guide (EPG) or an interactive programming guide (IPG). Additional and alternative types of events may trigger the recommendation process.

Having initiated the recommendation process, the recommendation processor may select candidate content to consider for recommendation to the individual (block 504). As described above, the content selected for recommendation may be on-demand content, content scheduled for broadcast, or digitally recorded content. As also mentioned above, the content selected for recommendation may be video content, audio content, text content, interactive content, and so forth. The video content may be a movie, a movie trailer, an episode of a television series, a news program, a video clip, and other types of video content. The recommendation processor may then retrieve the consumption history for the individual (block 506) and select one item of previously consumed content from the consumption history (block 508). The recommendation processor may then pair the content selected for recommendation with the previously consumed content (block 510) as described above. The recommendation processor may then obtain a similarity score for the pairing of the selected content (block 512) as also described above. The recommendation processor itself may implement the functionality to determine the similarity score. Alternatively the recommendation processor may request and receive the similarity score from a similarity processor that determines the similarity score.

The recommendation processor may then calculate the time difference for the paired content (block 514). As described above, the time difference may be provided as the number of hours that have elapsed between the consumption time of the previously consumed content and a reference time associated with the candidate content. As also noted above, the reference time for the candidate content may depend on the content type of the candidate content. Where the candidate content is prescheduled content, the reference time may be a time at which the prescheduled content is scheduled for broadcast. Where the candidate content is digitally recorded content, the reference time may be a time at which the individual accesses a playback feature of the recording device and views a set of digitally recorded content available for playback. Where the candidate content is on-demand content, the reference time may be a time at which the individual accesses an on-demand feature of a gateway device and views a set of on-demand content available for selection. In some example implementations, the reference time may be the time at which the recommendation processor selects the candidate content, i.e., the time at which the recommendation process occurs.

The recommendation processor may then select a weight for the pairing of the selected content and bias that weighting based on the calculated time difference (block 516). As described above, biasing the weight may include increasing the weight as the time difference approaches a multiple of a first predetermined time period (e.g. 24 hours) and decreasing the weight as the time difference departs from a multiple of the first predetermined time period (e.g., 24 hours). Biasing the weight may also include increasing the weight further, i.e., to a greater extent when the time difference approaches a multiple of a second predetermined time period that is also a multiple of the first predetermined time period. As noted above, the first predetermined time period may be 24 hours, and the second predetermined time period may be 168 hours (e.g., a week long time difference). Stated differently, a time-series of weight values plotted with respect to time difference may exhibit increasing weight values as the time difference approaches a multiple of the first predetermined time period (e.g., approaches 24 hours) and exhibit a peak weight value where the time difference is exactly a multiple of the first predetermined time period (e.g., is exactly a multiple 24 hours). The time-series of weight values may also exhibit decreasing weight values as the time difference departs from a multiple of the first predetermined time period (e.g., departs from a multiple of 24 hours) and exhibit a valley weight value where the time difference is exactly between two multiples of the first predetermined time period (e.g., exactly between two multiples of 24 hours, i.e., a multiple of 24 hours plus 12 hours). The weight values may then begin to increase again as the time difference departs from this middle point and again approaches the next multiple of the first predetermined time period (e.g., 24 hours). Since the weight value correlates with the time difference, in this example, the proposed approach provides improved recommendations even when the time difference isn't exactly a multiple of the first predetermined time period (e.g., 24 hours), for example, where the time difference is a multiple of the first predetermined time period plus or minus x number of minutes (e.g., −0.5 hours, +0.5 hours, etc.). Biasing the weight may further include applying a decay factor to the weight. As described above, the decay factor, in some example implementations, may be inversely proportional to the time difference such that the decay factor decreases as the time difference increases.

Having obtained the initial similarity score and the weight, the recommendation processor may then obtain a weighted similarity score for the pairing of the previously-consumed content with the selected candidate content (block 518) as also described above. If the viewing history includes more previously-consumed content to be paired with the candidate content (block 520:Y), then the recommendation processor may select the next previously-consumed content (block 522) and repeat the steps described above to obtain another weighted similarity score for the new pairing of content. Once no more previously-consumed content remains to be paired with the candidate content selected (block 520:N), the recommendation processor may aggregate the weighted similarity scores (block 524) and generate a recommendation score for the candidate content based on the aggregated weighted similarity scores (block 526).

The recommendation processor may make more than one recommendation to the viewer. Accordingly if additional candidate content is available for recommendation (block 528:Y), the recommendation processor may select new candidate content to recommend to the viewer (block 530) and repeat the steps described above to generate another recommendation score for the additional candidate content. Once the recommendation processor has finished generating recommendation scores (block 528:N), the recommendation processor may generate a list of recommended content (block 532) and sort the list based on the respective recommendation scores obtained (block 534), e.g., in descending order of recommendation score. The list of recommended content may include respective entries that each identify the content (e.g., the title of the content), the recommendation score for the content, and other types of information associated with the content. The list of recommended content may then be provided to a device for presentation to the user (block 536), e.g., a television, computer monitor, display screen, audio speakers, or other type of information output device. The user may then browse the list of recommended content items and select one of the recommended content items to view.

Figure 6A:
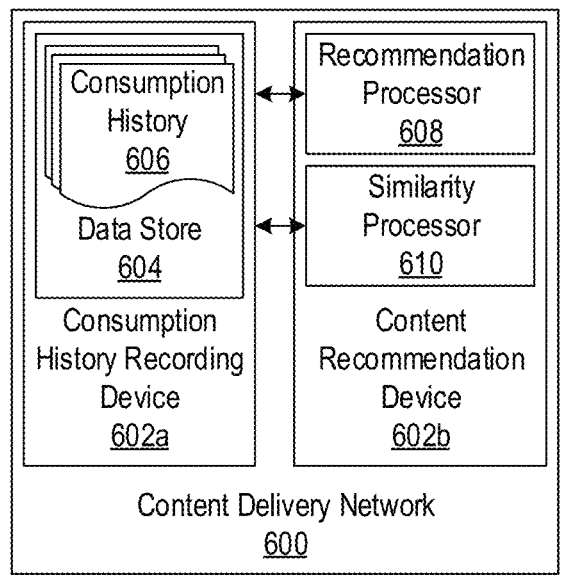
FIG. 6A illustrates an example of an implementation of a system that provides content recommendations.
Figure 6B:
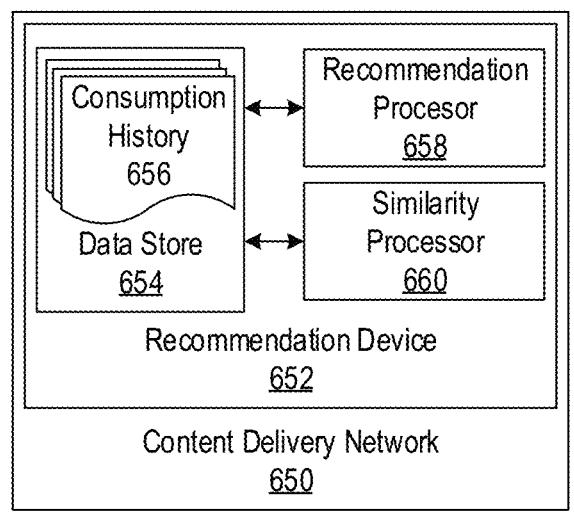
FIG. 6B illustrates another example of an implementation of a system that provides content recommendations.

The steps described above may be respectively performed by various devices of a content delivery network. Such devices may include network level components or client devices. Network level components may include components of a content delivery network, e.g., a server. Client devices may include gateway devices (e.g., STBs, DVRs), personal computing devices (PCs), laptop computing devices, handheld mobile computing devices, and display device (e.g., televisions, monitors, display screens). FIGS. 6A-B illustrate example implementations of aspects of the present disclosure.

In FIG. 6A, one example of an implementation of a system that provides content recommendations is shown. In this example implementation, a content delivery network 600 may include multiple network level components in signal communication with each other. One of the network level components may be a consumption history recording device 602a having a data store 604 that stores multiple consumption histories 606 for respective individuals. Another one of the network components may be a content recommendation device 602b having a recommendation processor 608 that obtains the recommendation scores and the list of recommended content as well as similarity processor 610 that determines the similarity score for content pairings. The recommendation processor 608 may select the content to recommend to an individual and retrieve information regarding previously consumed content from the consumption history 606 for the individual. The similarity processor 610 may also retrieve information regarding previously consumed content from the consumption histories 606 in order to determine the similarity score. Although the recommendation processor 608 and the similarity processor 610 are shown as residing at the same content recommendation device 602b in FIG. 6A, it will be appreciated that the recommendation processor and the similarity processor may reside at different network level components in other example implementations. In addition the recommendation processor 608 and the similarity processor 610 may, in some examples, be implemented as a single processor that obtains the recommendations scores, the list of recommended content, and the similarity scores.

In FIG. 6B, another example of an implementation of a system that provides content recommendations is shown. In this other example implementation, a content delivery network 650 includes a recommendation device 652 that includes each of the data store 654 storing the consumption histories 656, the recommendation processor 658, and the similarity processor 660. It will be appreciated that the content delivery network 650 may include multiple recommendation devices such as recommendation device 652 that each serve a respective service area, e.g., a respective geographic region. Accordingly a content delivery network may therefore include multiple recommendation processors and multiple similarity processors respectively distributed among multiple recommendation devices. Additional and alternative implementations of the content delivery network that provides improved content recommendations will thus be appreciated with the benefit of this disclosure.

Figure 7:
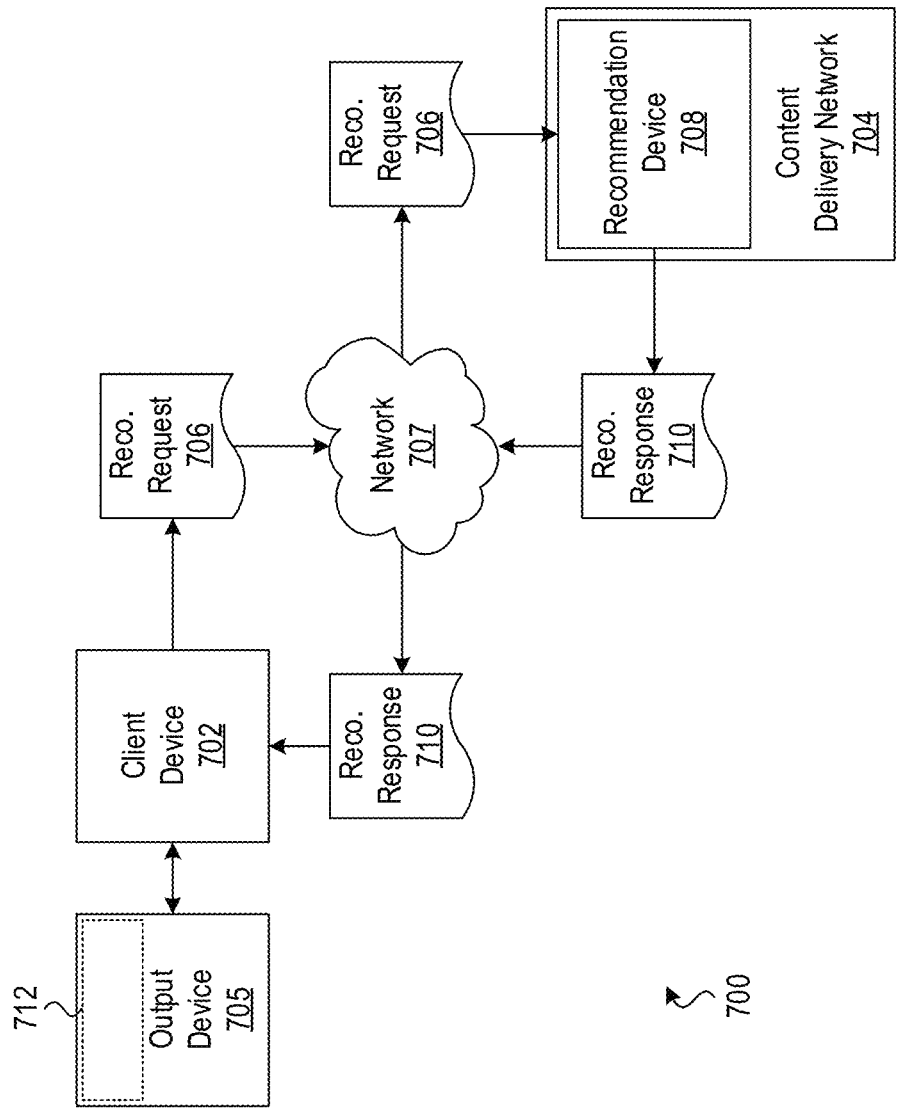
FIG. 7 illustrates an example workflow between components of an example of an implementation of a system that provides content recommendations.

Referring now to FIG. 7, an example workflow between components of an example of an implementation of a system 700 that provides video content recommendations is shown. The system 700 shown by way of example in FIG. 7, may include a client device 702 in signal communication with a content delivery network 704 via a network 707 such as those described above. The client device 702 may be similar to or the same as the client device 112a described above with reference to FIG. 1. The client device 702 may also be in signal communication with an output device 705 such as a video output device, audio output device, or audiovisual output device. As also described above, the client device 702 may submit a recommendation request 706 to the content delivery network 704. A recommendation device 708 of the content delivery network 704 may receive the recommendation request 706 and perform a content recommendation procedure such as the one described above. The recommendation device 708 may be similar to or the same as the recommendation devices 602b or 652 respectively described above with reference to FIGS. 6A-B.

Upon completion of the content recommendation procedure, the recommendation device 708 may prepare a recommendation response 710 and transmit the recommendation response back to the client device 702. As noted above the recommendation device 708 or the client device 702 may be configured to sort the list of recommended content based on the recommendation scores obtained. Accordingly in some example implementations, the recommendation response 710 may include the list of recommended content sorted by the recommendation device 708. In other example implementations, the recommendation response 710 may only include the recommendation scores obtained at the recommendation device 708, and the client device 702 may sort the list of recommended content based on the recommendations scores received. Additional and alternative implementations may also be employed, which will be appreciated with the benefit of this disclosure. The client device 702 may then provide the list of recommended content 712 to the output device 705 for presentation to the individual. The individual may then browse the list of recommended content and select recommended content to consume.

Figure 8:
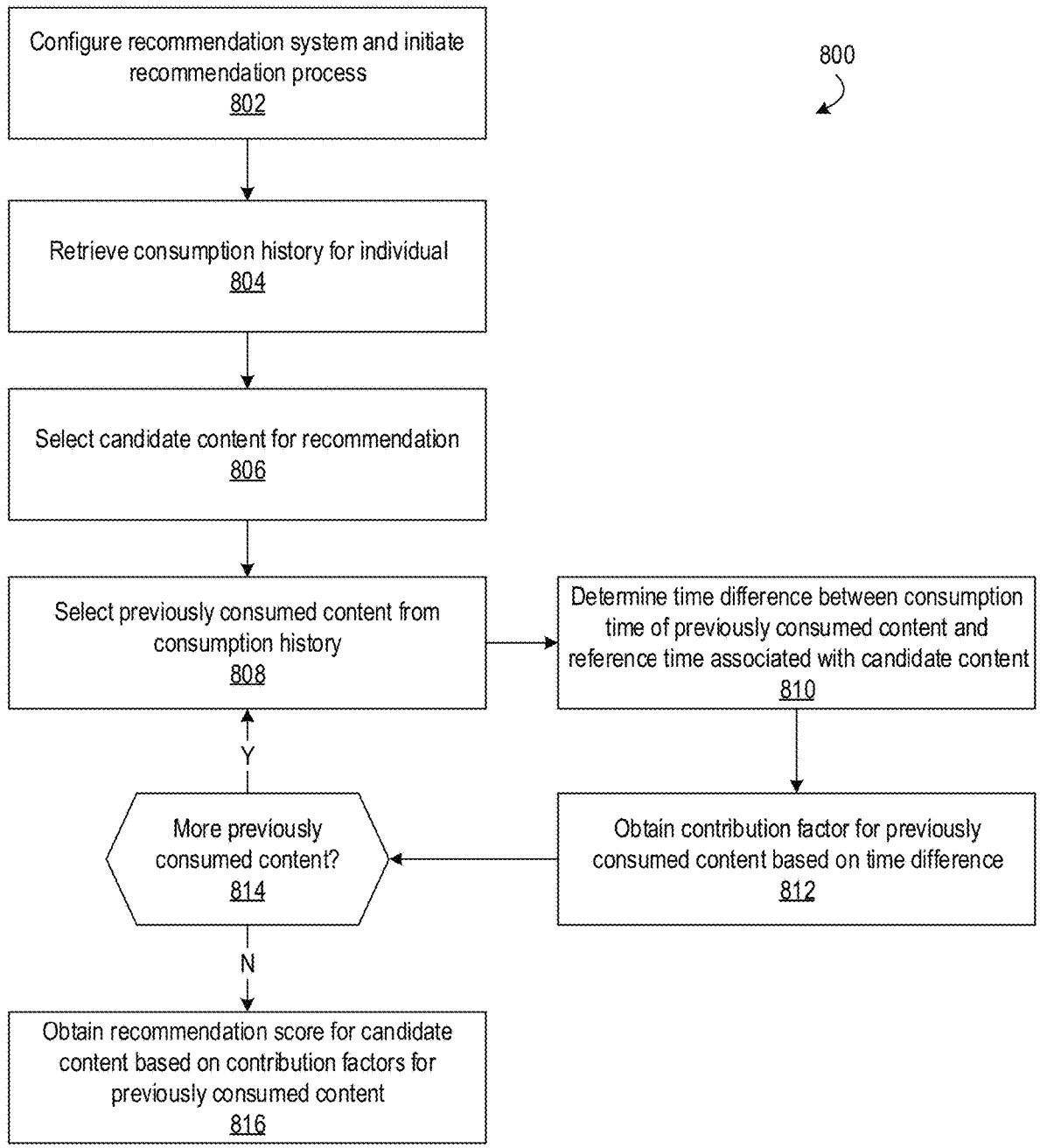
FIG. 8 illustrates a flowchart of example method steps for providing content recommendations.

Referring now to FIG. 8, a flowchart of an example method 800 for providing content recommendations is shown. A recommendation system may be configured, and the recommendation system may initiate a recommendation process (block 802). As described above, configuring the recommendation system may include compiling consumption histories of content consumed by one or more individuals. Having initiated the recommendation process, the recommendation system may retrieve the consumption history for an individual (block 804), and select candidate content to recommend to the individual (block 806). The recommendation system may then select an item of previously consumed content from the consumption history for the individual (block 808) and determine a time difference between the consumption time of the previously viewed content and a reference time associated with the candidate content (block 810). The recommendation system may then obtain a contribution factor for the previously viewed content based on that time difference (block 812). If more previously consumed content remains in the consumption history to evaluate (block 814:Y), the recommendations system may select the next item of previously consumed content and repeat these steps to obtain an additional contribution factor for that additional item of previously consumed content. Once the desired previously consumed content items have been evaluated (block 814:N), the recommendation system may obtain a recommendation score for the candidate content based, at least in part, on the set of contribution factors obtained for the previously consumed content items (block 816).

As explained in detail above, the recommendation system may employ the contribution factors to improve the recommendations made by recommendation techniques that utilize content similarity. It is emphasized, however, that the recommendation system may employ the contribution factors to improve the recommendations made by other recommendation techniques that utilize other content characteristics. As noted above, another recommendation technique may make content menu recommendations based on content genre (e.g., drama, comedy, horror, etc.) In this approach, the recommendation system may obtain a recommendation score for each content menu (e.g., a drama menu, a comedy menu, a horror menu, etc.). The content menu recommendation scores may be based on the previously consumed content within a particular genre (e.g., previously consumed drama content, previously consumed comedy content, previously consumed horror content, etc.). Using the techniques above, contribution factors for the previously consumed content may be obtained based on the viewing periodicities observed with respect to content genre, e.g., viewing habits that indicate consumption of content of the same genre x hours apart. Accordingly content consumed some multiple of x hours previous will contribute relatively more to the recommendation score for the content menu of that genre via the contribute factor obtained for that previously consumed content. In this example, the content menus may be presented to an individual ranked by their respective content menu recommendation scores. A recommendation system may also employ a hybrid recommendation technique in which both a content menu recommendation score and individual candidate content recommendation scores are obtained. In this example, the recommendation system may obtain recommendation scores using the techniques described above and rank the content menus as well as the candidate content items within those menus (e.g., using content similarity). Additional and alternative examples will be appreciated with the benefit of this disclosure.

Systems and methods for providing content recommendations have been described above. As described above, content recommendations may be generated based on the proximity of a time difference to a multiple of a predetermined time period (e.g., 24 hours) where that time difference is based on a consumption time of consumed content and a reference time associated with unconsumed content available to be recommended. It will be apparent to those skilled in the art that various modifications and variations can be made without departing from the scope or spirit. Other embodiments will be apparent to those skilled in the art from consideration of the specification and practice disclosed herein. For example, instead of applying a weight to a similarity score, the similarity score for content pairings may be adjusted higher or lower based on the proximity of the time difference to a multiple of the predetermined time period in order to obtain an adjusted similarity score. The similarity score, for example, may be adjusted to be relatively higher when the time difference is relatively closer to a multiple of the predetermined time period and adjusted to be relatively lower when the time difference is relatively further from a multiple of the predetermined time period. Content recommendations may then be generated based, at least in part, on the adjusted similarity score. It is intended that the specification and examples be considered as illustrative only, with a true scope and spirit being indicated by the following claims.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
    causing, by a computing device, insertion of an advertisement into video content, wherein selection of the advertisement is based on viewing habit information, associated with at least one user, that indicates:
        viewing information for at least one part of a day associated with a first time period multiple before a viewing occasion; and
        viewing information for at least one part of a day associated with a second time period multiple before the viewing occasion, wherein the second time period multiple is different than the first time period multiple; and
    causing output, during the viewing occasion and via at least one display device associated with the at least one user, of the video content and the selected advertisement.

2. The method of claim 1, wherein:
    the first time period multiple is a day time period multiple and the viewing habit information indicates daily viewing habits; and
    the second time period multiple is a week time period multiple and the viewing habit information indicates weekly viewing habits.

3. The method of claim 1, wherein
    the selection of the advertisement is by a first application server; and
    the causing insertion of the advertisement is by a second application server.

4. The method of claim 1, wherein the causing insertion of the advertisement is by an application server of a headend.

5. The method of claim 1, further comprising causing formatting of the selected advertisement for insertion into the video content.

6. The method of claim 1, further comprising receiving one or more advertisements formatted for insertion into the video content, wherein the advertisement inserted into the video content is a formatted advertisement of the one or more advertisements.

7. The method of claim 1, further comprising:
    monitoring viewing habits of one or more users of the at least one user; and
    storing, at a data store as part of the viewing habit information associated with the at least one user, viewing habit information corresponding to the monitored viewing habits of the one or more users.

8. The method of claim 1, further comprising receiving, from a computing device at least a portion of the viewing habit information associated with the at least one user.

9. The method of claim 1, wherein the at least one part of the day associated with the second time period multiple is different than the at least one part of the day associated with the first time period multiple.

10. The method of claim 1, further comprising storing, at a data store and based on at least one of demographic information for a service area or user interest information for a service area, at least a portion of the video content.

11. The method of claim 1, wherein the video content comprises at least one of:
    broadcasted video content;
    transmitted video content;
    recorded video content; or
    streamed video content.

12. The method of claim 1, further comprising receiving the video content from a television network.

13. The method of claim 1, wherein the viewing habit information indicates at least one of:
    one or more video content items previously viewed by one or more users of the at least one user;
    at least one video content item that comprises an inserted advertisement; or
    at least one consumption history associated with one or more users of the at least one user.

14. The method of claim 1, wherein the video content comprises at least one of:
    a movie;

an episode of a television series;
a news program;
a sports program; or
a video clip.

15. The method of claim 1, wherein:
the viewing habit information is associated with a first user of the at least one user and is associated with a second user of the at least one user; and
the at least one display device comprises a first display device associated with the first user and a second display device associated with the second user; and
output of the video content and the selected advertisement comprises output, via the first display device and via the second display device, of the video content and the selected advertisement.

16. A computing device comprising:
one or more processors; and
memory storing instructions that, when executed by the one or more processors, cause the computing device to:
cause insertion of an advertisement into video content, wherein selection of the advertisement is based on viewing habit information, associated with at least one user, that indicates:
viewing information for at least one part of a day associated with a first time period multiple before a viewing occasion; and
viewing information for at least one part of a day associated with a second time period multiple before the viewing occasion, wherein the second time period multiple is different than the first time period multiple; and
cause output, during the viewing occasion and via at least one display device associated with the at least one user, of the video content and the selected advertisement.

17. The computing device of claim 16, wherein:
the first time period multiple is a day time period multiple and the viewing habit information indicates daily viewing habits; and
the second time period multiple is a week time period multiple and the viewing habit information indicates weekly viewing habits.

18. The computing device of claim 16, wherein the selection of the advertisement is by an application server.

19. The computing device of claim 16, wherein the computing device is located at a headend.

20. The computing device of claim 16, wherein the instructions, when executed by the one or more processors, further cause the computing device to cause formatting of the selected advertisement for insertion into the video content.

21. The computing device of claim 16, wherein:
the instructions, when executed by the one or more processors, further cause the computing device to receive one or more advertisements formatted for insertion into the video content; and
the advertisement inserted into the video content is a formatted advertisement of the one or more advertisements.

22. The computing device of claim 16, wherein the instructions, when executed by the one or more processors, further cause the computing device to:
monitor viewing habits of one or more users of the at least one user; and
store, at a data store as part of the viewing habit information associated with the at least one user, viewing habit information corresponding to the monitored viewing habits of the one or more users.

23. The computing device of claim 16, wherein the instructions, when executed by the one or more processors, further cause the computing device to receive, from another computing device, at least a portion of the viewing habit information associated with the at least one user.

24. The computing device of claim 16, wherein the at least one part of the day associated with the second time period multiple is different than the at least one part of the day associated with the first time period multiple.

25. The computing device of claim 16, wherein the instructions, when executed by the one or more processors, further cause the computing device to store, at a data store and based on at least one of demographic information for a service area or user interest information for a service area, at least a portion of the video content.

26. The computing device of claim 16, wherein the video content comprises at least one of:
broadcasted video content;
transmitted video content;
recorded video content; or
streamed video content.

27. The computing device of claim 16, wherein the instructions, when executed by the one or more processors, further cause the computing device to receive the video content from a television network.

28. The computing device of claim 16, wherein the viewing habit information indicates at least one of:
one or more video content items previously viewed by one or more users of the at least one user;
at least one video content item that comprises an inserted advertisement; or
at least one consumption history associated with one or more users of the at least one user.

29. The computing device of claim 16, wherein the video content comprises at least one of:
a movie;
an episode of a television series;
a news program;
a sports program; or
a video clip.

30. The computing device of claim 16, wherein:
the viewing habit information is associated with a first user of the at least one user and is associated with a second user of the at least one user; and
the at least one display device comprises a first display device associated with the first user and a second display device associated with the second user; and
output of the video content and the selected advertisement comprises output, via the first display device and via the second display device, of the video content and the selected advertisement.

31. A non-transitory computer-readable medium storing instructions that, when executed by a computing device, configure the computing device to:
cause insertion of an advertisement into video content, wherein selection of the advertisement is based on viewing habit information, associated with at least one user, that indicates:
viewing information for at least one part of a day associated with a first time period multiple before a viewing occasion; and
viewing information for at least one part of a day associated with a second time period multiple before the viewing occasion, wherein the second time period multiple is different than the first time period multiple; and cause output, during the viewing occasion and via at least one display device associated with the at least one user, of the video content and the selected advertisement.

32. The non-transitory computer-readable medium of claim 31, wherein:
the first time period multiple is a day time period multiple and the viewing habit information indicates daily viewing habits; and
the second time period multiple is a week time period multiple and the viewing habit information indicates weekly viewing habits.

33. The non-transitory computer-readable medium of claim 31, wherein the selection of the advertisement is by an application server.

34. The non-transitory computer-readable medium of claim 31, wherein the computing device is located at a headend.

35. The non-transitory computer-readable medium of claim 31, wherein the instructions, when executed, further configure the computing to format the selected advertisement for insertion into the video content.

36. The non-transitory computer-readable medium of claim 31, wherein the instructions, when executed, further configure the computing device to receive one or more advertisements formatted for insertion into the video content, wherein the advertisement inserted into the video content is a formatted advertisement of the one or more advertisements.

37. The non-transitory computer-readable medium of claim 31, wherein the instructions, when executed, further configure the computing device to:
monitor viewing habits of one or more users of the at least one user; and
store, at a data store as part of the viewing habit information associated with the at least one user, viewing habit information corresponding to the monitored viewing habits of the one or more users.

38. The non-transitory computer-readable medium of claim 31, wherein the instructions, when executed, further configure the computing device to receive, from another computing device, at least a portion of the viewing habit information associated with the at least one user.

39. The non-transitory computer-readable medium of claim 31, wherein the at least one part of the day associated with the second time period multiple is different than the at least one part of the day associated with the first time period multiple.

40. The non-transitory computer-readable medium of claim 31, wherein the instructions, when executed, further configure the computing device to store, at a data store and based on at least one of demographic information for a service area or user interest information for a service area, at least a portion of the video content.

41. The non-transitory computer-readable medium of claim 31, wherein the video content comprises at least one of:
broadcasted video content;
transmitted video content;
recorded video content; or
streamed video content.

42. The non-transitory computer-readable medium of claim 31, wherein the instructions, when executed, further configure the computing device to receive the video content from a television network.

43. The non-transitory computer-readable medium of claim 31, wherein the viewing habit information indicates at least one of:
one or more video content items previously viewed by one or more users of the at least one user;
at least one video content item that comprises an inserted advertisement; or
at least one consumption history associated with one or more users of the at least one user.

44. The non-transitory computer-readable medium of claim 31, wherein the video content comprises at least one of:
a movie;
an episode of a television series;
a news program;
a sports program; or
a video clip.

45. The non-transitory computer-readable medium of claim 31, wherein:
the viewing habit information is associated with a first user of the at least one user and is associated with a second user of the at least one user; and
the at least one display device comprises a first display device associated with the first user and a second display device associated with the second user; and
output of the video content and the selected advertisement comprises output, via the first display device and via the second display device, of the video content and the selected advertisement.

46. A system comprising:
a first computing device comprising:
one or more first processors; and
memory storing first instructions that, when executed by the one or more first processors, cause the first computing device to:
cause insertion of an advertisement into video content, wherein selection of the advertisement is based on viewing habit information, associated with at least one user, that indicates:
viewing information for at least one part of a day associated with a first time period multiple before a viewing occasion; and
viewing information for at least one part of a day associated with a second time period multiple before the viewing occasion, wherein the second time period multiple is different than the first time period multiple; and
cause output, during the viewing occasion and via at least one display device associated with the at least one user, of the video content and the selected advertisement,
a second computing device comprising:
one or more second processors; and
memory storing second instructions that, when executed by the one or more second processors, cause the second computing device to:
output, during the viewing occasion and via a display device, the video content and the selected advertisement.

47. The system of claim 46, wherein the first computing device comprises an application server of a headend.

48. The system of claim 46, wherein:
the first instructions, when executed by the one or more first processors, further cause the first computing device to receive one or more advertisements formatted for insertion into the video content; and the advertisement inserted into the video content is a formatted advertisement of the one or more advertisements.

49. The system of claim 46, wherein the first instructions, when executed by the one or more first processors, further cause the first computing device to cause formatting of the selected advertisement for insertion into the video content.

50. The system of claim 46, wherein the first instructions, when executed by the one or more first processors, further cause the first computing device to store, at a data store as part of the viewing habit information associated with the at least one user, viewing habit information corresponding to monitored viewing habits of one or more users.

* * * * *